United States Patent [19]

Blahut et al.

[11] 4,346,437

[45] Aug. 24, 1982

[54] MICROCOMPUTER USING A DOUBLE OPCODE INSTRUCTION

[75] Inventors: Donald E. Blahut, Holmdel; Richard L. Ukeiley, Marlboro, both of N.J.

[73] Assignee: Bell Telephone Laboratories, Incorporated, Murray Hill, N.J.

[21] Appl. No.: 71,712

[22] Filed: Aug. 31, 1979

[51] Int. Cl.³ .............................................. G06F 9/22
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,657,705 | 4/1972 | Mekota, Jr. ......................... | 364/200 |
| 3,735,355 | 5/1973 | Balogh, Jr. et al. ................. | 364/200 |
| 3,739,352 | 6/1973 | Packard .............................. | 364/200 |
| 3,821,715 | 6/1974 | Hoff, Jr. et al. ..................... | 364/200 |
| 3,978,456 | 8/1976 | Moran ................................. | 364/200 |
| 3,990,052 | 11/1976 | Gruner ............................... | 364/200 |
| 4,090,237 | 5/1978 | Dimmick ............................ | 364/200 |
| 4,109,310 | 8/1978 | England et al. ..................... | 364/200 |
| 4,206,503 | 6/1980 | Woods et al. ....................... | 364/200 |

OTHER PUBLICATIONS

Signetics Applications Notes Re Pla's, Jul. 1975, pp. 4-22.
Supplement to the TTL Data Book for Design Engineers, 1st Ed., Texas Instruments, Inc., 1974, pp. S-296 and S-297.
Soucek, Branko, *Microprocessors and Microcomputers*, John Wiley & Sons, Inc., N.Y., 1976, Chap. 6 "4004/4040 Microprocessors", pp. 221-250.
Intel MCS-4 Microcomputer Set, Jan. 1972, Intel Corp., Santa Clara, Calif., pp. 1-12.
Intel 1977 Data Catalog, 1977, Intel Corp., Santa Clara, Calif., pp. 8-15 through 8-20 and 8-4 through 8-9.
TMS 1000 Series Data Manual, 1976, Texas Instr. Corp., "MOS/LSI One-Chip Microcomputers", p. 6.

*Primary Examiner*—Harvey E. Springborn
*Attorney, Agent, or Firm*—Richard B. Havill

[57] ABSTRACT

A microcomputer having a 4-bit instruction register uses some double operation code (opcode) instructions thereby increasing its instruction set over the sixteen instruction limit imposed by the instruction register. During a single opcode instruction operation, a 4-bit opcode word is fetched from memory (20), is loaded into the instruction register (32), and is applied to a logic circuit (601, 603 or 621, 623). The resulting output from the logic circuit (601, 603 or 621, 623) determines the state of a latching device (610 or 630). The latching device (610 or 630) is latched into a first state in response to the output of the logic circuit, and the first opcode word stored in the instruction register controls processing of a data word to be fetched from storage. During a double opcode instruction operation, a first opcode word is fetched into the instruction register. The latching device (610 or 630) is latched into a second state in response to the output of the logic circuit. Thereafter the microcomputer fetches a second 4-bit opcode word from memory and reloads the same instruction register (32) with that second opcode word. The second state of the latching device (610 or 630) together with the second opcode word stored in the instruction register (32) subsequently control the sequence of processing a data word to be fetched from storage during execution of the double opcode instruction.

4 Claims, 17 Drawing Figures

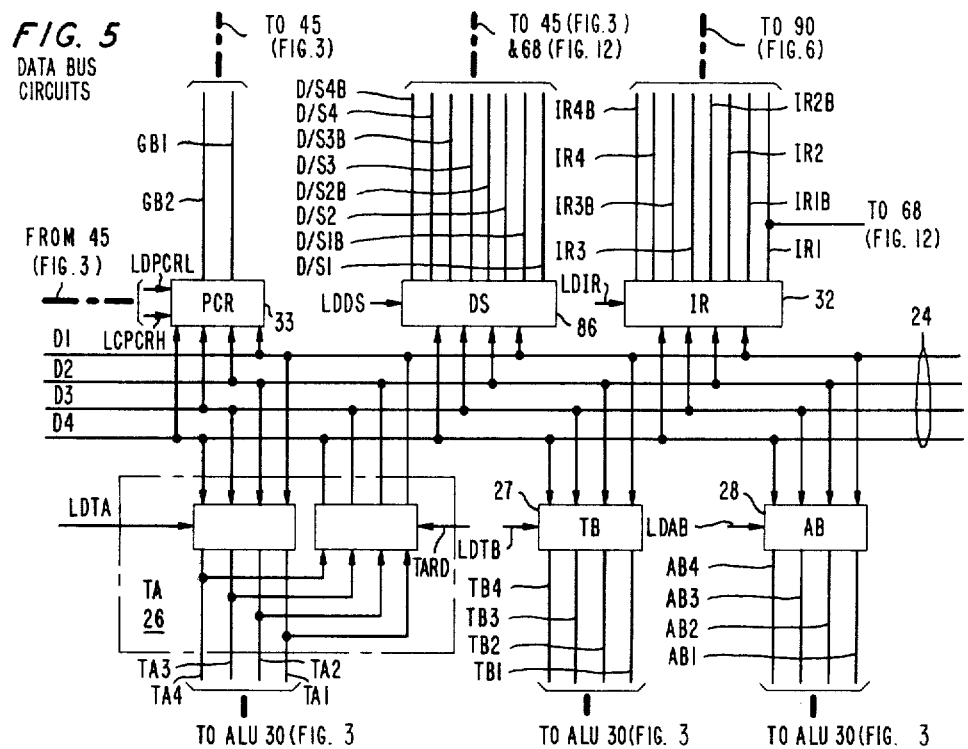
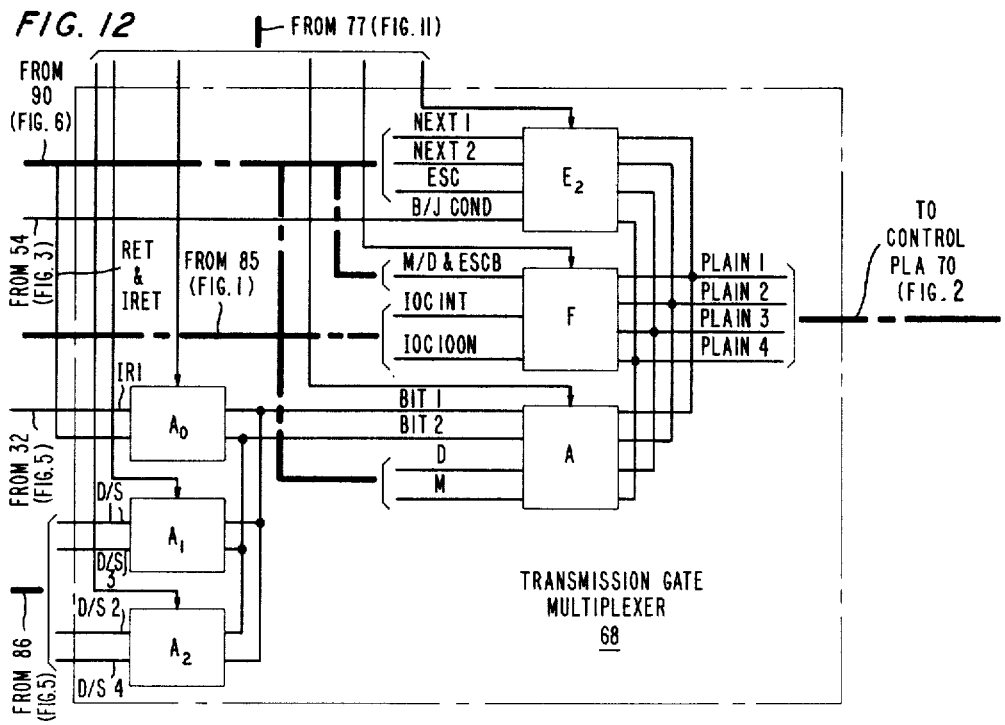

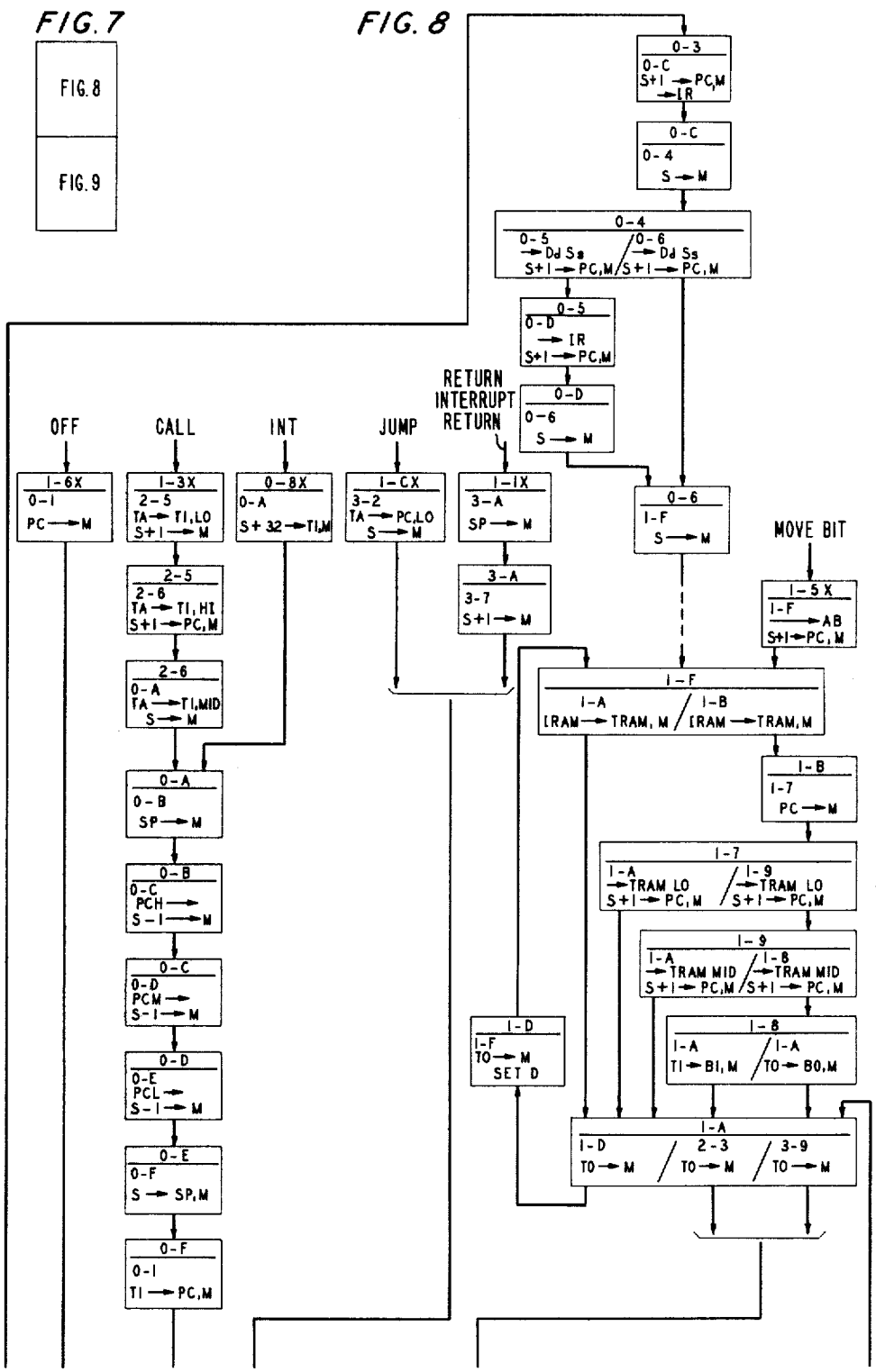

MICROCOMPUTER USING A DOUBLE OPCODE INSTRUCTION

CROSS-REFERENCE TO RELATED APPLICATIONS

Related subject matter is included in the following copending patent applications:

D. E. Blahut-D. H. Copp-D. C. Stanzione, Ser. No. 974,425, entitled "Data Processing Apparatus Providing Variable Operand Width Operation" and filed Dec. 29, 1978;

D. E. Blahut-D. H. Copp-D. C. Stanzione, Ser. No. 974,363, entitled "Data Processing Apparatus Providing Autoloading of Memory Pointer Registers" and filed Dec. 29, 1978;

D. E. Blahut-D. H. Copp-D. C. Stanzione, Ser. No. 974,361, entitled "Data Processing Apparatus Providing Autoincrementing of Memory Pointer Registers," filed Dec. 29, 1978 and now U.S. Pat. No. 4,240,142;

V. K. Huang, entitled "Special Address Generation Arrangement" and filed concurrently herewith;

D. E. Blahut-V. K. Huang-R. L. Townsend, Jr., Ser. No. 71,750, entitled "Microcomputer Arranged for Direct Memory Access" and filed concurrently herewith.

TECHNICAL FIELD

This invention relates generally to a microcomputer and, more particularly, to a microcomputer using double opcode instructions.

BACKGROUND OF THE INVENTION

Microcomputers are being designed and fabricated as single large scale integrated (LSI) circuit chips including an arithmetic logic unit, a system controller, registers, program and data memories, and timing circuits. Typically, such microcomputers use metal oxide semiconductor/large scale integration (MOS/LSI) technology. Other technologies can be and are used. The length of code words used during the processing of data in such microcomputers is determined by the number of leads included in an internal data bus. At present, single chip microcomputers are being fabricated with 4-bit (4-lead) parallel data buses.

Data processing sequences typically are controlled by the system controller operating in response to an operation code (opcode) which is stored in an instruction register during the execution of each instruction fetched from the program memory. An instruction is the smallest operating step that a programmer can invoke. It is a statement that specifies an operation and the values of or the locations of its operands. The opcode applied to the controller causes the microcomputer to step through a sequence of states during which appropriate machine functions occur to accomplish whatever specific task, or operation, is desired by a programmer invoking the instruction.

The instruction set is limited in the number of possible operations by the length of the opcode words stored in the instruction register. For instruction registers having N stages, up to $2^N$ basic opcodes can be provided. In a prior art single chip microcomputer having a 4-bit parallel data bus, an 8-bit instruction register is provided so that as many as $2^8$ basic opcodes can be provided. See, for instance, INTEL Data Catalog 1977, pp. 8-4 to 8-9, and 8-15 to 8-20, and TMS 1000 Series Data Manual 1976, Texas Instruments, Inc., page 6.

In processing each instruction, such a microcomputer fetches two consecutive nibbles of opcode from memory and loads them into two halves of the instruction register before proceeding with the processing of any data. The entire 8-bit opcode is used for controlling the sequence of operations during the instruction. When it is desirable to operate a microcomputer faster, fetching two nibbles of opcode for each instruction may present a problem because each fetch of a nibble of opcode occupies some portion of the total operating time available to the processor.

One way to shorten the processing time is by reducing the number of nibbles included in instructions, such as by reducing the number of nibbles in some opcodes. As previously mentioned, such a reduction of the number of nibbles stored in the instruction register may unduly reduce the basic instruction set together with the number of different operation sequences available and thereby also reduce the processing power of the microcomputer.

Thus, there exists a dilemma in that a large number of bits are desired in opcodes for increasing the processing power of the microcomputer, and a small number of bits are desired in opcodes for reducing the time required to process instructions.

BRIEF DESCRIPTION OF THE INVENTION

This dilemma is overcome in a microcomputer including a memory for storing single and double opcode instructions, each instruction having plural words, each word having n bits; an instruction register having n stages; a data bus coupling the memory to the instruction register; an arithmetic logic unit interconnected with the data bus and arranged for executing at least a part of defined processing sequences on data supplied over the data bus, the processing sequences being defined by the single and double opcode instructions; a controller circuit for producing a plurality of control signals including a clock signal, the controller circuit causing the microcomputer to process the single and double opcode instructions by first fetching the single opcode word of the single opcode instruction from the memory through the data bus to fill the instruction register; a latching device having plural states; a logic circuit interconnected with the instruction register and with the latching device and responsive to the single opcode word of the single opcode instruction stored in the instruction register and to the clock signal produced by the controller circuit for producing a signal which latches the latching device into a first state indicating that there is sufficient information in the instruction register for prescribing the processing sequence defined by the single opcode instruction; the controller circuit being responsive to the first state of the latching device and to the opcode word of the single opcode instruction currently stored in the instruction register for causing the microcomputer to execute the specific processing sequence defined by the single opcode instruction; the controller circuit being responsive to the microcomputer completing the execution of the processing sequence defined by the single opcode instruction for causing the microcomputer to continue processing the single and double opcode instructions by fetching a first opcode word of the double opcode instruction from the memory through the data bus to fill the instruction register; the logic circuit being responsive to the first opcode word of the double opcode instruction stored in the instruction register and to the clock signal produced by the controller circuit for producing a signal which latches the latching device into a second state indicating that there is insufficient information stored in the instruction register for prescribing the processing sequence defined by the double opcode instruction; the controller circuit being responsive to the second state of the latching device for causing the microcomputer to fetch a second opcode word of the double opcode instruction from the memory through the data bus to replace the first opcode word in the instruction register before the microcomputer executes the processing sequence defined by the double opcode instruction; and the controller circuit further being responsive to the second state of the latching device and to the second opcode word of the double opcode instruction currently stored in the instruction register for causing the microcomputer to execute the specific processing sequence defined by the double opcode instruction.

BRIEF DESCRIPTION OF THE DRAWINGS

The invention will be more fully understood from the following detailed description of an illustrative embodiment thereof when that description is read in conjunction with the attached drawing wherein FIGS. 1, 2 and 3, when positioned in accordance with FIG. 4, form a block diagram of a microcomputer;

FIG. 5 is a logic schematic of data bus circuits;

FIG. 7 presents the positioning of FIGS. 8 and 9, which form a state diagram showing sequences of operation for instructions performed by the microcomputer of FIGS. 1–3;

FIG. 12 is a logic schematic of a transmission gate multiplexer;

DETAILED DESCRIPTION

Figure 1:
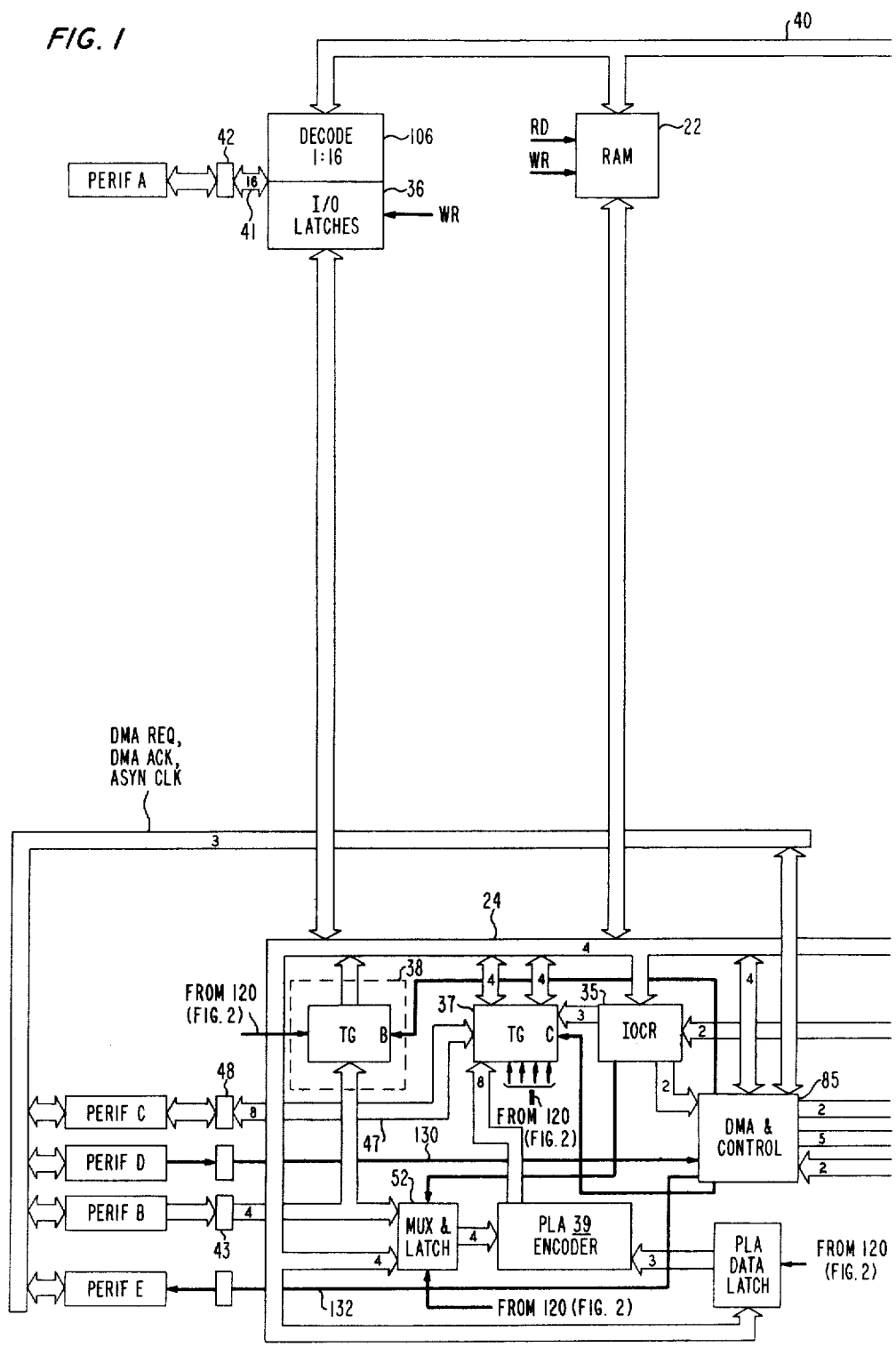
Figure 2:
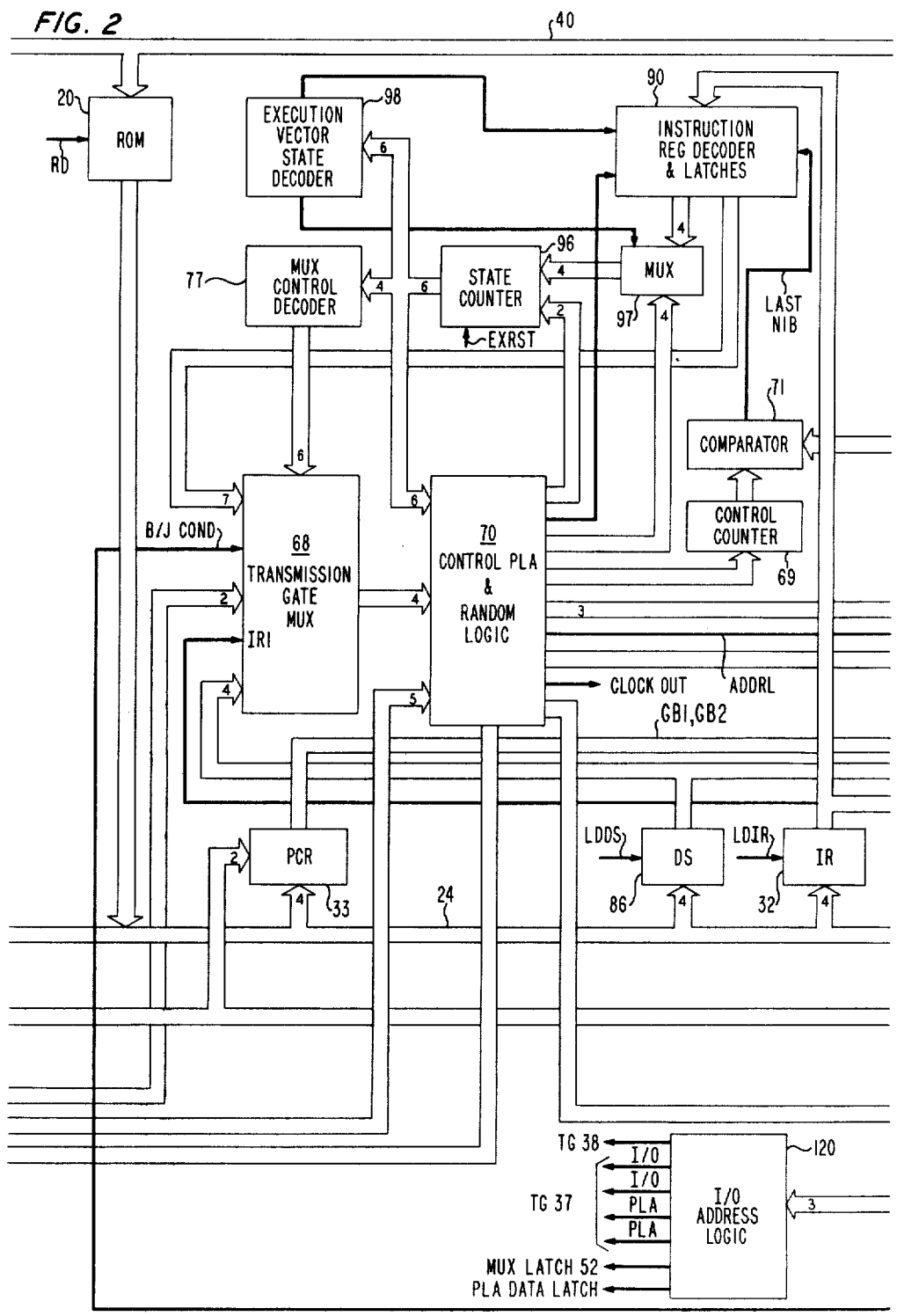
Figure 3:
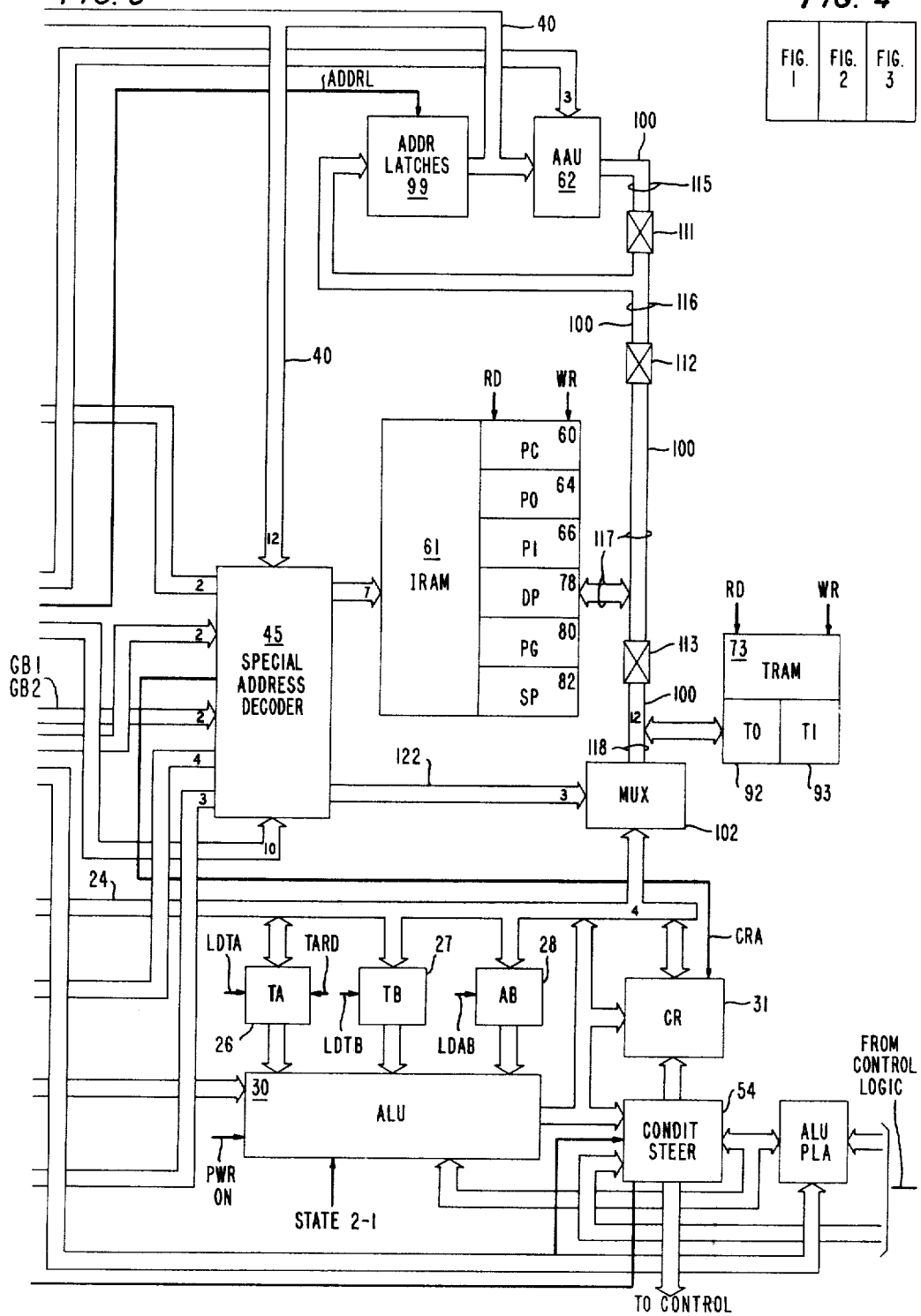
Figure 4:
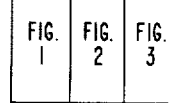

Referring now to FIGS. 1, 2 and 3, there is shown a block diagram of a microcomputer that is fabricated on a single complementary metal oxide semiconductor/large scale integration (CMOS/LSI) chip. Included on the chip are a read only memory 20 and a random access memory 22 which are coupled through a 4-bit on-chip data bus 24 and a group of temporary registers (TA, TB and AB) 26, 27 and 28 to a 4-bit parallel arithmetic logic unit (ALU) 30. Several other on-chip registers are coupled to the on-chip data bus 24 so that they are addressable by the user. Extensive input/output circuitry and direct memory access circuitry are provided on the chip for increasing the versatility and efficiency of the microcomputer. The memory and registers are to be described in more detail hereinafter.

A controller section, shown mostly in FIG. 2, coordinates and executes sequential operations of the microcomputer while it accomplishes whatever functions are required in accordance with instructions applied thereto from the read only memory 20 or the random access memory 22. The contents of a condition register (CR) 31 are modified as a result of operations occurring in the arithmetic logic unit 30.

Although the arithmetic logic unit 30 is a 4-bit parallel circuit arrangement, it is capable of performing arithmetic and logic operations on either single or multiple nibble operands in response to a single program instruction. In response to information stored in an instruction register (IR) 32 and a processor control register (PCR) 33, the controller section of FIG. 2 determines the mode and the type of operation performed on single and multiple nibble operands. Basically on opcode word, stored in the instruction register 32, determines a processing sequence for designated data.

This sequence may be modified depending upon what information is stored in the processor control register 33. In particular, operations on multiple nibble operands are accomplished by a sequence resulting from such a modification to the processing sequence. This modification to the processing sequence together with decoded control signals, derived in reponse to special addresses encountered during processing, cause the controller section to vary the number of nibbles of data that are processed by the instruction stored in the instruction register. Generation of such special addresses and the decoding of control signals derived therefrom are discussed in detail in a companion patent application, Ser. No. 71,717, filed in the name of V. K. Huang concurrently herewith and entitled "Special Address Generation Arrangement".

Memory

The memory arrangement includes both the read only memory 20 primarily for program storage and the random access memory 22 primarily for data storage.

Read only memory 20 is presented in FIG. 2 with the controller section because this memory primarily provides instructions for controlling the execution of machine operations. Programming of the read only memory occurs at the mask level and is not alterable.

Random access memory 22 is presented in FIG. 1 with the input/output circuitry because the random access memory often is involved in transfers of data to and from one of a plurality of peripheral devices (A, B, C, D and E) interconnecting with the input/output circuitry and located at the lefthand side of FIG. 1.

Input/Output Structure

In FIG. 1 there is shown an extensive on-chip input/output circuit arrangement. Included therein are an input/output control register (IOCR) 35, input/output latches 36, a bidirectional input/output port 37 and an inport 38. These are incorporated in an input/output bus structure arrangement with a programmed logic array (PLA) encoder 39 for transferring information in one direction or the other between the on-chip data bus 24 and the peripheral devices A, B, C, D and E.

The input/output latches 36 are memory mapped input/output, i.e., latching circuits addressed in the memory address space. These input/output latches 36 include four 4-bit registers which connect with both an address bus 40 and the on-chip data bus 24 and are controlled by address and write (WR) signaling from the controller section. They are used for connecting a peripheral device, such as peripheral device A, to the microcomputer. For illustrative purposes, peripheral device A is considered to include 16 bits of data arranged for parallel input and output.

Information stored in the 16 bits of the peripheral device A may be transferred through chip terminals 42 and a 16-bit bidirectional bus 41 to the input/output latches where they are written under control of a write signal WR from the control section of FIG. 2. Subsequently that data is transferred through the data bus 24 sequentially by nibbles, one nibble in parallel at a time, to the random access memory 22 or a selected addressable on-chip register.

Conversely information stored in the random access memory 22 or in an addressable on-chip register can be transferred through the data bus 24 sequentially by nibbles, one nibble in parallel at a time, to the input/output latches 36. Subsequently that data is transferred, as four nibbles in parallel, through the bidirectional bus 41 and the chip terminals 42 to the peripheral device A.

The inport 38 includes a group of four tristate gates interposed between four chip terminals 43 and the on-chip data bus 24 for transferring information in one direction only from a peripheral device B through the terminals 43 and a 4-bit wide bus to the on-chip data bus 24. The gates of the inport 38 are arranged in addressable memory space and are controlled by a signal B, applied from the DMA and control circuit 85, and an address signal, decoded by the I/O address logic circuit 120 from signals applied by a special address decoder 45.

The bidirectional input/output port 37 also is memory mapped input/output circuitry. It includes two separate transmission circuits, each circuit having an 8-bit wide set of latches. In each transmission circuit, each latch is connected in series with one of an 8-bit wide set of tristate gates for transmission in one direction. These two separate transmission circuits are interconnected in parallel with each other end-to-end but in opposite directions. One end of the interconnected circuits connects by way of an 8-bit bidirectional input/output bus 47 with chip terminals 48 and therethrough to the peripheral device C. The other end of the interconnected circuits connects with the on-chip data bus 24. A control signal C, applied from the DMA and control circuit 85, and an address signal, decoded by the I/O address logic circuit 120 from signals applied by the special address circuit 45, control the input/output port 37 in response to conditions existing in both the microcomputer and the peripheral device C.

Information can be transferred in either direction between the peripheral device C and the random access memory 22 or addressable on-chip registers. Thus any data, applied by the peripheral device C through the terminals 48, the input/output bus 47 and the bidirectional input/output port 37 to the data bus 24, can be written either into the random access memory 22 or into any addressable register. Conversely any data, stored in either the random access memory 22 or any addressable register, can be transferred through the data bus 24, the bidirectional input/output port 37, the input/output bus 47 and the chip terminals 48 to the peripheral device C.

Bidirectional input/output port 37 includes two memory mapped 4-bit registers. The highest address 4-bit register of the input/output port 37 is used to accomplish a handshaking procedure when the bidirectional input/output bus 47 is transferring information in either direction between the microcomputer and the peripheral device C. These four bits of information are stored in the input/output port 37 during the first cycle of a transfer sequence and are held in the port 37 during the entire transfer sequence. These 4 bits are used respectively as busy and ready flags and as strobe-in and strobe-out control signals. The data transfer is accomplished through the lower address 4-bit register in the port 37.

The programmed logic array (PLA) encoder 39 is programmable at the mask level for performing user selected translations, such as 4-to-8 bit or 8-to-8 bit decoder/demultiplexer operations. A multiplexer 52 determines whether 4-bit data is applied to the programmed logic array 39 from either the data bus 24 or the inport chip terminals 43. The input/output port 37 determines whether 8-bit data is applied to the programmed logic array 39 from the input/output bus 47. This arrangement of the input/output port 37 and the input/output bus 47 with the programmed logic array is useful for making binary coded decimal-to-binary conversions, for binary coded decimal-to-seven segment decoding and for implementing some Boolean expressions.

The microcomputer is arranged to receive 4-bit words serially by bit from the peripheral device D through a chip terminal and a lead 130 into a shift register included in the DMA and control circuit 85. From the control circuit 85 these words are transferred through the data bus 24 into the memory location being addressed.

Also the microcomputer is arranged for transferring 4-bit words from memory into a shift register in the DMA and control circuit 85. These 4-bit words are transferred serially by bit from the shift register through a lead 132 and a chip terminal into the peripheral device E.

Addressable Registers

The microcomputer includes many registers arranged in different ways to accomplish a variety of convenient functions. Some of those registers have been mentioned previously and some have not. All of the registers are to be described in more detail hereinafter. The microcomputer shown in FIGS. 1, 2 and 3 includes ten (10) user addressable registers but unlike most microcomputers there is no pre-assigned accumulator.

User Addressable Special Registers

The user addressable registers include the following registers.

The condition register 31 is a 4-bit set of bistable latch circuits which store signals indicating the status, or condition, of data resulting from arithmetic or logic operations except when the condition register is a destination. The condition register and the condition steering circuit 54 are interposed between the arithmetic logic unit 30 and the internal data bus 24. Both the arithmetic logic unit and the internal data bus are arranged to process 4-bit data in parallel. The condition register is addressable so that it can be accessed for loading and reading by way of the data bus. The status signals, called "flags", include zero, parity, carry, and overflow flags. Although arithmetic operations produce data which may affect any of the four flags, logic operations produce data which may affect only the zero and parity flags and conditional instructions do not affect any of the flags. Because the microcomputer operates on operands having various numbers of nibbles, the flag signals are generated and stored avoiding erroneous intermediate and final flag signals. A group of flag control, or condition steering, circuit arrangements 54 generate this correct status information for all arithmetic and logic operations performed by the microcomputer. Either this status information or information loaded by program control through the data bus 24 is the data stored in the condition register 31.

In the condition register, the zero flag circuit arrangement includes an all zeros logic circuit with a feedback path used for handling accurately multiple nibble operation data. Some logic and timing signals couple the stored all zeros signal to a latch circuit for storage and readout to the data bus 24 while another latch can change state in response to later processing conditions.

Additionally in the condition register, the parity flag circuit also includes a feedback arrangement for handling multiple nibbles. A latch circuit stores the parity signal for retention and readout to the data bus 24 in response to program control.

Also in the condition register, the carry flag circuit includes master and slave latch circuits for receiving and storing carry signals resulting from arithmetic operations in the arithmetic logic unit 30. In response to program control, the carry flag stored in the slave latch can be read out to the data bus 24.

Further in the condition register, the overflow flag circuit is a latch circuit which is controlled by overflow signals generated in the arithmetic logic unit 30.

As previously mentioned, the condition register circuits are addressable and can be written with information present on the internal data bus 24. Alternatively, once information is stored in the condition register 31 that information can be read out onto the internal data bus 24 under program control.

A 12-bit wide program counter (PC) 60 stores the address of the next instruction to be executed. It operates conventionally wherein its contents are set to a hexadecimal address x(000) at the commencement of processing. Thereafter the contents are incremented by an address arithmetic unit (AAU) 62 some specific number of times during each instruction unless the contents are changed during the execution of the current instruction, such as by a jump instruction. Such incrementing continues throughout processing until the desired program sequence is completed.

Memory pointer registers (P0 and P1) 64 and 66 are 8-bit registers used for indirectly addressing memory locations. When used as pointers, they each store the two least significant nibbles of the address being pointed to.

As shown in FIGS. 2 and 5, the processor control register (PCR) 33 is a several bit wide register, two bits GB1 and GB2 of which enable a programmer to set the operand width at either 4, 8, 12, or 16 bits. Processor control register 33 is coupled to the data bus and is arranged as an address in addressable memory space. Information is stored in the register 33 from time to time in accordance with the programmer's requirements. A typical program routine may load the processor control register 33 only once. A "Move" instruction (MOV) is used to load the register 33. The data to be loaded is moved from a specific address to the address of the register 33. That data is stored in the register 33 until some later time when it is changed by another "Move" instruction. Some routines will load and reload the register 33 during a single routine.

Information stored in the processor control register helps control the processing of data in the microcomputer. The two bits, stored in the processor control register for controlling operand width, are coupled through a transmission gate multiplexer 68 to the input of a control programmed logic array (PLA) and random logic circuit 70 where they help determine the sequence of operations performed by the microcomputer.

The two bits of data stored in the processor control register determine how many nibbles each operand includes during the processing of each specific instruction. As previously mentioned the microcomputer is arranged to operate on operands having either 4, 8, 12, or 16 bit widths even though the on-chip data bus 24 and the arithmetic logic unit 30 include circuitry for handling only 4 bits at a time. This is accomplished by acting on the data in serial fashion, 4 bits at a time.

In FIG. 3 the arithmetic logic unit 30, in response to signals from the controller section, steps through specific operations an appropriate number of times to accommodate the various width operands. Each time the arithmetic logic unit performs one of the specified operations requiring an updating of any of the flags, resulting accurate condition information is stored in the condition register 31 and the operation is tallied in a counter 69 by a signal from the control PLA and random logic circuit 70. In the controller section, a comparator 71 compares the state of the counter 69 with the two bits GB1 and GB2 stored in the processor control register 33 and coupled through the special address decoder 45 to the comparator 71. If the counter state does not equal the number stored in the processor control register, the controller section causes the processor including the arithmetic logic unit 30 to repeat the operation propagating any carry and updating parity, zeros, and overflow information resulting from the prior operation on that operand if necessary. When the state of the counter 69 equal the number stored in the processor control register 33, the complete operation on the multiple nibble operand is concluded and the controller section proceeds to the next phase of execution of the instruction. At that time, the condition register 31 contains accurate information relating to the flags resulting from the prescribed operation on the multiple nibble operand.

As previously mentioned, data is loaded into the processor control register 33 only occasionally during operation and typically may be loaded only once per routine or program. Once loaded, that control data remains in the processor control register and in effect determines part of the logical configuration of the processor. This control data stored in the processor control register contributes to the control of processing of data until different control data is loaded into the processor control register. The programmer controls both the loading and the subsequent reloading of the control data into the processor control register in accordance with the specific needs for solving processing problems. Thus the microcomputer logic can be reconfigured from time to time other than by routine instructions to extend the capability of its instruction set. For a more detailed description of the arrangement and operation of the processor control register, the reader should refer to a patent application Ser. No. 974,425, filed in the names of D. E. Blahut, D. H. Copp and D. C. Stanzione on Dec. 29, 1978.

A direct memory access pointer (DP) 78 in FIG. 3 is an addressable 12-bit register which is used both for direct memory access operations and as an efficient counter for counting external events. For direct memory access operations, 12 bits of data are stored therein for pointing to any memory location which is to be a source or a destination of information in the direct memory access transfer. When used as a counter for an iterative external operation, the register 78 is loaded with 12 bits of data which are incremented by the address arithmetic unit 62 during each externally generated clock cycle. The external operation is terminated in response to an overflow signal of the address arithmetic unit 62.

A 4-bit page pointer register (PG) 80 is an addressable register that supplies the middle nibble of 12-bit addresses used for addressing the random access memory 22, the nine other addressable registers, and the input-/output circuits 36, 37, and 38. By loading the page pointer register 80 and thereafter using its contents to identify a sixteen (16) nibble block of memory, any location in that block of memory addresses can be addressed very efficiently with a single instruction. The lower nibble is supplied by the instruction from the read only memory 20. The upper nibble of the address is F hexadecimal and is supplied by hardware in the address arithmetic unit 62.

A 12-bit stack pointer register (SP) 82 is an addressable register used for conventional push down stack operation. Data loaded into the stack pointer is used for addressing the last information put on the stack. Under program control the data in the stack pointer is incremented or decremented by the address arithmetic unit 62 as items of information are put onto or are read out of the stack.

The input/output control register (IOCR) 35 in FIG. 1 is an addressable 6-bit register for storing, under program control, information that controls flow of data into and out of the microcomputer. Of the information stored in control register 35, 3-bits are applied to the input gate 37 and 1-bit is applied to the multiplexer (MUX) 52 for determining how data flows through gate 37 and MUX 52. Another 2-bits of the information stored in control register 35 are applied to a direct memory access and control circuit (DMA) 85 for determining whether that circuit is to control serial or parallel and input or output operations.

Addressable Accumulator Registers

As previously mentioned, there is no pre-assigned accumulator. Instead addressing modes allow registers in the random access memory 22 to function as accumulators for various instructions. By use of these registers in the random access memory, the microcomputer can accomplish a memory-to-memory data transfer for dyadic operations without any intermediate step through a permanent accumulator. These registers also function as destination and source registers for many arithmetic and logic functions.

Addressing

All of the storage locations of the read only memory 20, the random access memory 22, the input/output circuits and the previously described addressable registers are assigned locations in addressable memory space. Each address stores one nibble (4 bits wide). The address space is organized into decimal addresses 0 through 4095 or x(000) through X(FFF), wherein x indicates a hexadecimal number. Read only memory occupies the lower addresses starting with address x(000), and random access memory occupies the high addresses ending at x(FFF). The ten addressable registers and the input/output circuits are assigned addresses below the lowest address assigned to random access memory and are addressable like random access memory. Each random access memory location used for the registers has an address wherein the high nibble is F hexadecimal.

There are a variety of addressing modes for forming effective addresses of operands. There are four modes for developing destination addresses and four additional modes for developing source addresses.

The destination addressing modes are:
Mode 0—address is formed by concatenating the 4-bit numeral F hexadecimal with a 4-bit page pointer fetched from the page pointer register 80 and with a nibble provided by the instruction;
Mode 1—direct address;
Mode 2—address is the contents of the memory pointer register 64;
Mode 3—address is the contents of the memory pointer register 66.

The source addressing modes are:
Mode 0—address is formed by concatenating the 4-bit numeral F hexadecimal with the 4-bit page pointer fetched from the page pointer register 80 and with a nibble provided by the instruction;
Mode 1—direct address;
Mode 2—address is the contents of the memory pointer register 64;
Mode 3—immediate data.

The special address decoder 45 receives addresses applied by the address latches 99 through the address bus 40. This decoder converts special addresses for the condition register 31, the processor control register 33, the input/output control register 35, the input/output latches 36, the bidirectional input/output port 37, the inport 38, the program counter 60, the memory pointer registers 64 and 66, the direct memory access pointer register 78, the page pointer register 80 and the stack pointer register 82 to signals which identify and activate the appropriate register, as required during execution of a program.

Other Registers

Other registers in the microcomputer include the instruction register (IR) 32 and the destination/source register (DS) 86.

In FIGS. 2 and 5, the instruction register 32 is a 4-bit latching circuit which is coupled to the on-chip data bus 24 for receiving and storing one nibble of opcode at a time during the execution of each instruction. The first nibble of each instruction is always stored in the instruction register. While that nibble of opcode is stored, the instruction register 32 applies that code to an instruction register decoder and latches 90 within the controller section for partially controlling the sequence of operations during execution of the current instruction.

Figure 6:
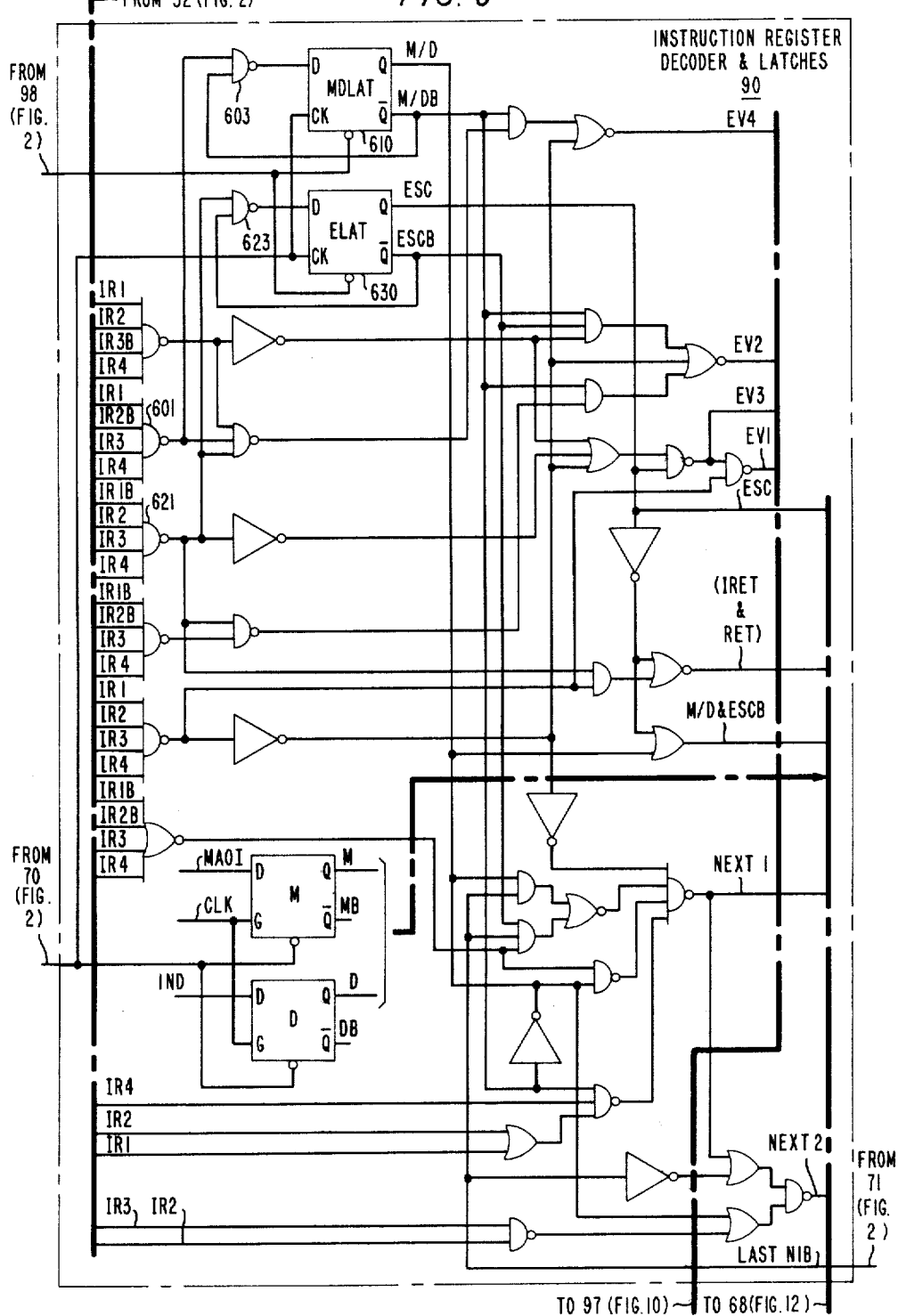
FIG. 6 is a logic schematic of an instruction register decoder and latches.

Referring now to FIGS. 2 and 6, information produced by a logic circuit in FIG. 6, in response to selected ones of the possible first nibbles of opcode, is stored for the duration of the instruction in the latches ELAT 630 and MDLAT 610 in the instruction register decoder and latches 90 for indicating that an additional nibble of opcode is to be used. The second nibble of each instruction is always stored in the destination/source register 86 of FIGS. 2 and 5. For a group of often used instructions, the first and second nibbles provide sufficient information to prescribe the desired execution sequence.

In response to the information stored in the latches ELAT and MDLAT of the instruction register decoder and latches 90, some instructions fetch a third nibble of the instruction (the second nibble of opcode) from memory and store it in the instruction register 32 in place of the first nibble of opcode. This second nibble of opcode continues partial control of the sequence of operations for the duration of that instruction. Such storage of a first opcode in the latches ELAT and MDLAT, followed by a second opcode replacing the first opcode in the instruction register for continuing partial control of the sequence of operations, is referred to as a double opcode operation. In any instruction using the double opcode operation, the third nibble of the instruction is the second opcode which is stored in the instruction register 32 in place of the first opcode.

In FIG. 6, the instruction register decoder and latches 90 includes two latches (ELAT and MDLAT) 630 and 610 for storing the information generated by a set of NAND gates in response to one of the specific codes of the first nibble of opcode stored in the instruction register 32. The latches ELAT and MDLAT are each set in response to a different opcode combination indicating double opcode operations. If the assigned opcode for either of these two latches is not stored in the instruction register 32 during the first nibble of any instruction, that latch remains reset for the entire instruction. On the other hand, if the assigned opcode for one of these latches is stored in the instruction register during the first nibble, that latch is set for the duration of that instruction. Once a latch ELAT or MDLAT is set, it causes the controller section to fetch a second nibble of opcode from read only memory 20 and to reload the instruction register 32 with that second nibble replacing the first nibble. The set state of the latch ELAT or MDLAT together with the second nibble of the opcode stored in the instruction register 32 subsequently controls processing of any data word to be fetched from any addressable storage location. Once either of the latches is set in the instruction register decoder and latches 90, it causes the controller section to step the processor through special steps. A more detailed description of the arrangement and operation of the microcomputer in response to double opcode instructions is included hereinafter under a separate heading.

As shown in FIGS. 2 and 5, a destination/source register 86 is a 4-bit latching circuit which is coupled to the on-chip data bus 24 for receiving the storing one nibble of addressing mode data during the execution of each instruction. As previously mentioned, the second nibble of each instruction is the nibble which is stored in the destination/source register 86 and is applied to the transmission gate multiplexer 68 for the duration of the current instruction. Two bits of this data coupled through the multiplexer 68 when taken together with information stored in page pointer register 80 are used by the control programmed logic array and random logic 70 for determining which one of 16 addresses in a block is to be used as a destination during execution of the current instruction. The other two bits of data from the destination/source register 86 and coupled through the multiplexer 68 when taken together with the information from the page pointer register 80 are used by the programmed logic array and random logic 70 for determining which one of the 16 addresses in the block is to be used as a source register during the execution of that same instruction if it is a dyadic instruction. If the instruction is other than a dyadic instruction, these latter two bits of data provide other control information for the control section.

The instruction register decoder and latches 90, as shown in FIG. 6, includes two flip-flops 610 and 630 for storing information generated by a logic circuit 603 and 623 in response to specific codes stored in the instruction register 32. Each of these flip-flops is set in response to a different opcode combination. One of the flip-flops 610 when set stores an indication that the instruction is either a monadic or a dyadic instruction. The other one of the flip-flops 630 stores an indication that the instruction is a conditional transfer instruction.

Controller Section

As shown in FIG. 2, the controller section of the microcomputer includes the read only memory 20 and the registers 32, 33, and 86 coupled to the on-chip data bus 24. Also the controller section includes the control programmed logic array and random logic 70, a state counter 96, the instruction register decoder and latches circuit 90, and a variety of additional logic circuitry. The sequence of events executed for an instruction is controlled by the controller section. Outputs from the control programmed logic array are latched in a master slave arrangement. The microcomputer is stepped through a series of states which are represented by rectangles including symbols in FIGS. 8 and 9 which are arranged as shown in FIG. 7.

Figure 9:
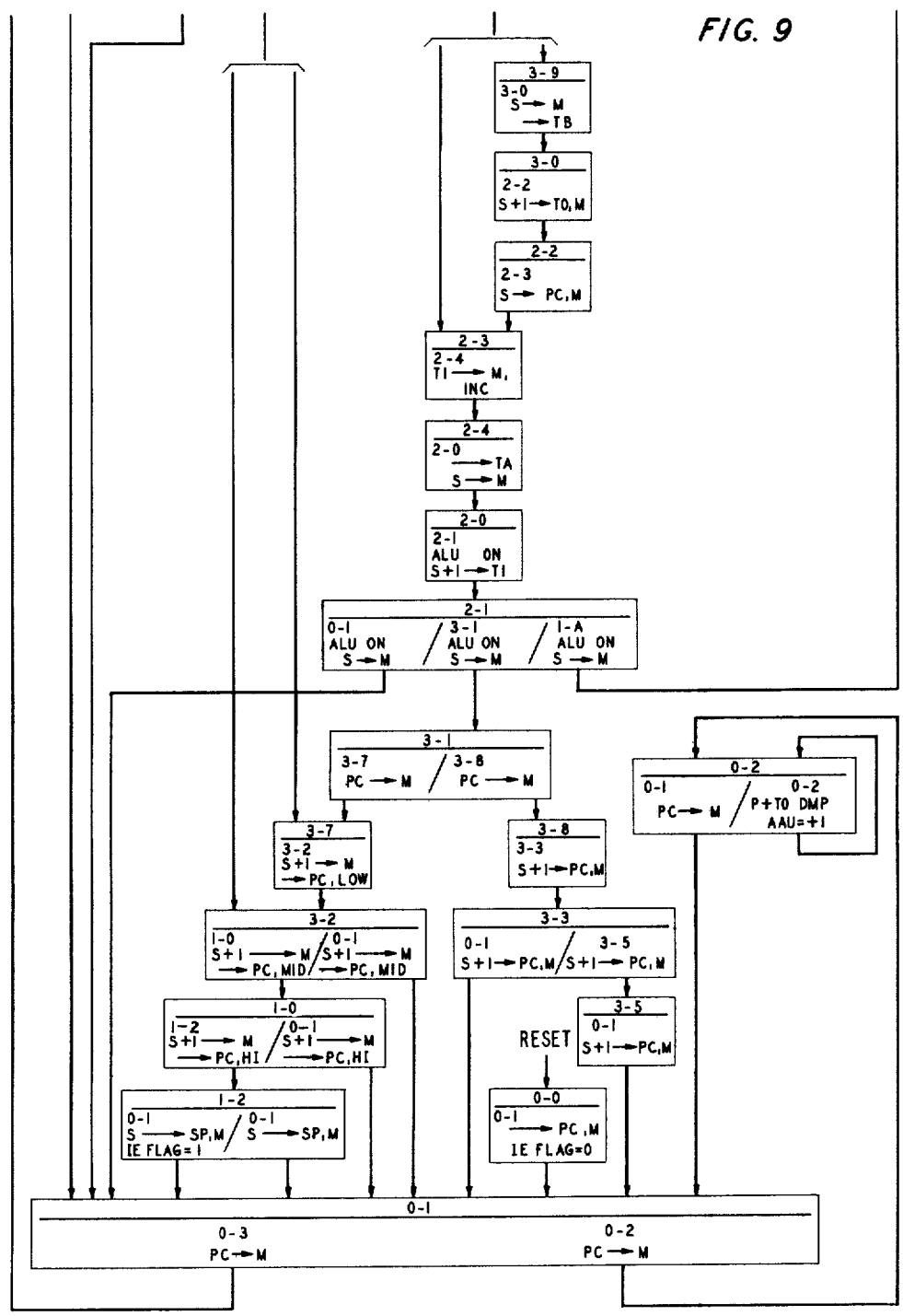

In FIGS. 8 and 9, each state is identified by a code at the top of the rectangle, e.g., "0-3" and "0-C", located at the tops of the uppermost two rectangles. Each state is determined in sequence by the output of the state counter 96 shown in FIGS. 2 and 10.

During a fetch sequence of operation, two nibbles are fetched from memory and are loaded respectively into the instruction register 32 during state 0-3 and in the destination/source register 86 during state 0-4. The first nibble is the opcode which is used for basic control of the sequence of subsequent events. The second nibble contains destination and source address information for operands to be used in executing the instruction. Every time the source/destination register 86 is loaded by a control signal LDDS, the register 28 also is loaded. As mentioned for some operations, a third nibble is fetched and is loaded into the same instruction register during state 0-5 for controlling some other sequences of subsequent events, in a manner to be described hereinafter.

After the fetch sequence is completed, an execution vector generated by the instruction register decoder and latches circuit 90 may be loaded into the state counter 96 so that the proper sequence of subsequent processing events is commenced. A multiplexer (MUX) 97 in FIGS. 2 and 10 determines whether information from the instruction register decoder and latches circuit 90 or from the control programmed logic array 70 is applied to the state counter 96.

Figure 10:
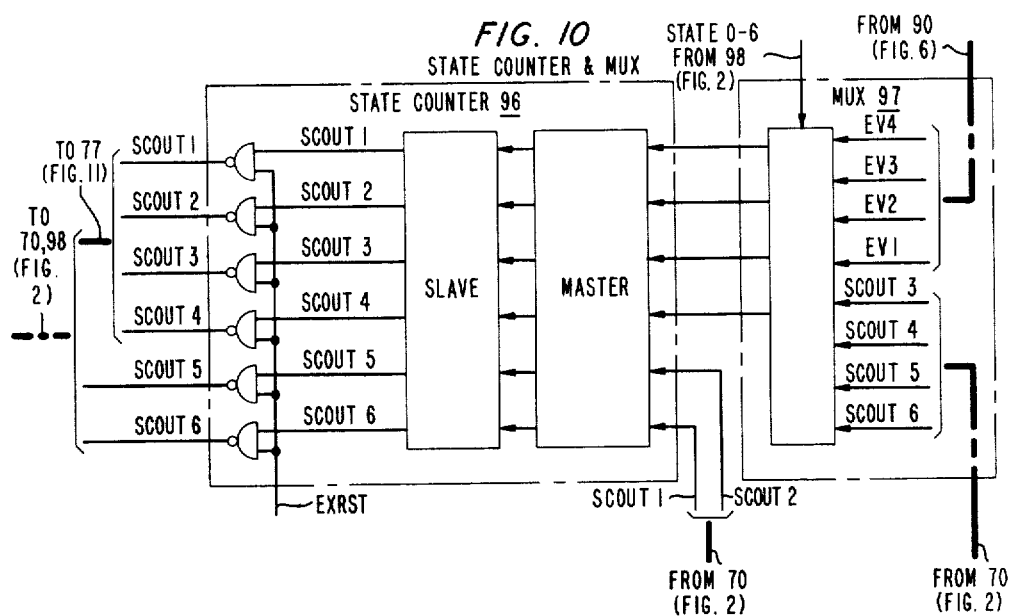
FIG. 10 is a logic schematic of a state counter and multiplexer.

As shown in FIGS. 2 and 10, the state counter is a 6-bit master/slave latch which temporarily retains state information typically generated by the control programmed logic array 70 but at certain times as modified by the execution vector information which is multiplexed, or jammed, into the state counter in lieu of the information from array 70. These times are determined by the decoder 98 which is responsive to the state of the state counter 96. When the state 0-6 occurs, decoder 98 applies a signal to the multiplexer (MUX) 97 for applying the execution vector to the state counter rather than the usual four outputs of the control array 70.

If the instruction is a monadic or dyadic instruction, one or more address pointers are formed and are loaded into one or both of a pair of temporary addressing registers (T0 and T1) 92 and 93 of FIG. 3. Once the addresses are formed, the controller initiates fetching the specified operands from storage and loading them into one or more of the arithmetic logic unit registers 26 and 27. The arithmetic logic unit 30 is then activated to execute the appropriate function and generate a result. Condition flags are set in the condition register 31 in accordance with the results of the arithmetic logic unit operation as processed by the condition steering circuit 54. The comparator 71 of the controller then decides whether or not the arithmetic logic unit 30 should operate on another nibble of operand. This is accomplished by comparing the state of the counter 69 with the operand width stored in the processor control register 33. If another nibble of the operand is to be processed, the controller section fetches an additional nibble or nibbles and activates the arithmetic logic unit an appropriate number of times. This type of operation continues during the execution of each instruction until the number of nibbles processed equals the number representing the operand width as stored in the processor control register 33.

Control Programmed Logic Array

The control programmed logic array 70 of FIG. 2 is an arrangement of logic circuits which perform the logic of a known programmable logic array, such as one described in *Signetics Applications Notes RE PLAs*, Signetics, Inc., July 1975, pages 4–22. As shown in FIGS. 2 and 10, the control programmed logic array 70 has two outputs which are looped through the state counter 96 back to inputs of the array and four which are looped through the multiplexer 97 and the state counter 96 back to inputs of the control programmed logic array for stepping the array through sequences of states during operation of the microcomputer.

As shown in FIGS. 2 and 10, the multiplexer 97 is an 8-to-4 multiplexer. The arrangement and operation of such a multiplexer is well known and may be reviewed by reference to pages S-296 and S-297 of the *Supplement to the TTL Data Book for Design Engineers*, first edition, Texas Instruments, Inc.

As shown in FIGS. 2 and 10, state counter 96 is a master/slave latch having six inputs and six outputs. Two of the inputs SCOUT 1 and SCOUT 2 are applied directly from outputs of the control programmed logic array. The four other inputs are applied from MUX 97. Normally the four inputs from MUX 97 are four additional outputs SCOUT 3-SCOUT 6 from the control programmed logic array. Only during state 0-6 do those four inputs switch over to four execution vector outpus EV 1-EV 4 from the instruction register decoder and latches 90.

An additional input lead from a chip terminal applies an external reset signal EXRST to the state counter when a user desires to reset the microcomputer. Applying the reset signal forces the output of the state counter to all zeros. Such output will initiate a reset routine.

Figure 11:
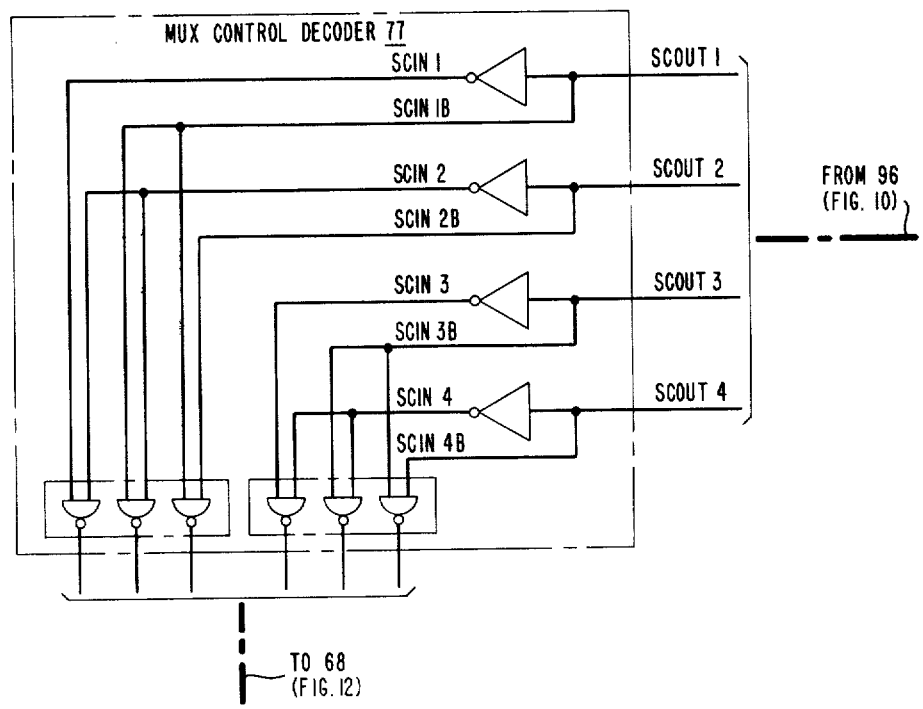
FIG. 11 is a logic schematic of a decoder.
Figure 15:
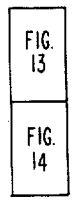

As shown in FIGS. 2 and 11, the multiplex control decoder circuit 77 includes two sets of logic gates which produce control signals for two sets of transmission gate multiplexers in the multiplexer 68 of FIGS. 2 and 12. Each of these sets of multiplexers includes three transmission gates which are opened and closed by the states of control signals. Only one out of the three gates of each set is closed for transferring information at any one time. Although the operation of the multiplexer 68 is described in greater detail hereinafter, the following briefly describes its operation. Each gate of the first set of transmission gates A0, A1 and A2 in the multiplexer 68 controls the transfer of two pieces of information to a pair of inputs of one transmission gate A of the second set of gates in the multiplexer 68. Each gate of the second set of transmission gates A, F and E2 controls transfer of either three or four pieces of information to four input leads of the control programmed logic array 70.

Execution Vector Logic

As shown in FIGS. 2 and 6, the instruction register decoder and latches 90 is interposed between the instruction register 32 and the state counter 96 in the controller section. Inputs are applied from the instruction register, the control programmed logic array and from an execution vector state decoder 98. Part of the resulting output from the instruction register decoder and latches 90 is called an execution vector. The execution vector includes four bits EV 1-EV 4, which determine how to execute the current instruction and how to process the current operand. The execution vector is multiplexed with part of the outputs of the control programmed logic array 70 and is loaded into the state counter 96 at a predetermined time during state 0-6 of the execution of an instruction.

Once loaded into the state counter, the execution vector determines which one of the states defined in FIGS. 8 and 9 is executed thereafter. Each state loaded by way of the execution vector is identified in FIGS. 8 and 9 by the symbol X at the top of the state. This entire execution vector operation enables a large fan out through branches in the sequence chart without requiring an inordinately large chip area for the controller section shown in FIG. 2. By jamming the execution vector into the state counter, many inputs and word lines which otherwise would be required in the control programmed logic array 70 have been eliminated.

As previously mentioned, the execution vector is multiplexed into the state counter alternatively with part of the outputs from the control programmed logic array 70. The execution vector state decoder 98, responsive to the state of the state counter 96, identifies the correct time (state 0-6) at which the execution vector should be jammed into the state counter in lieu of the outputs from the control programmed logic array. An appropriate enabling signal is applied from the decoder 98 to the multiplexer 97. The resulting state thus jammed into the state counter determines which branch of the sequence chart is executed during the rest of the current instruction.

Address Arithmetic Unit, Address Latches and Address Bus

Figure 13:
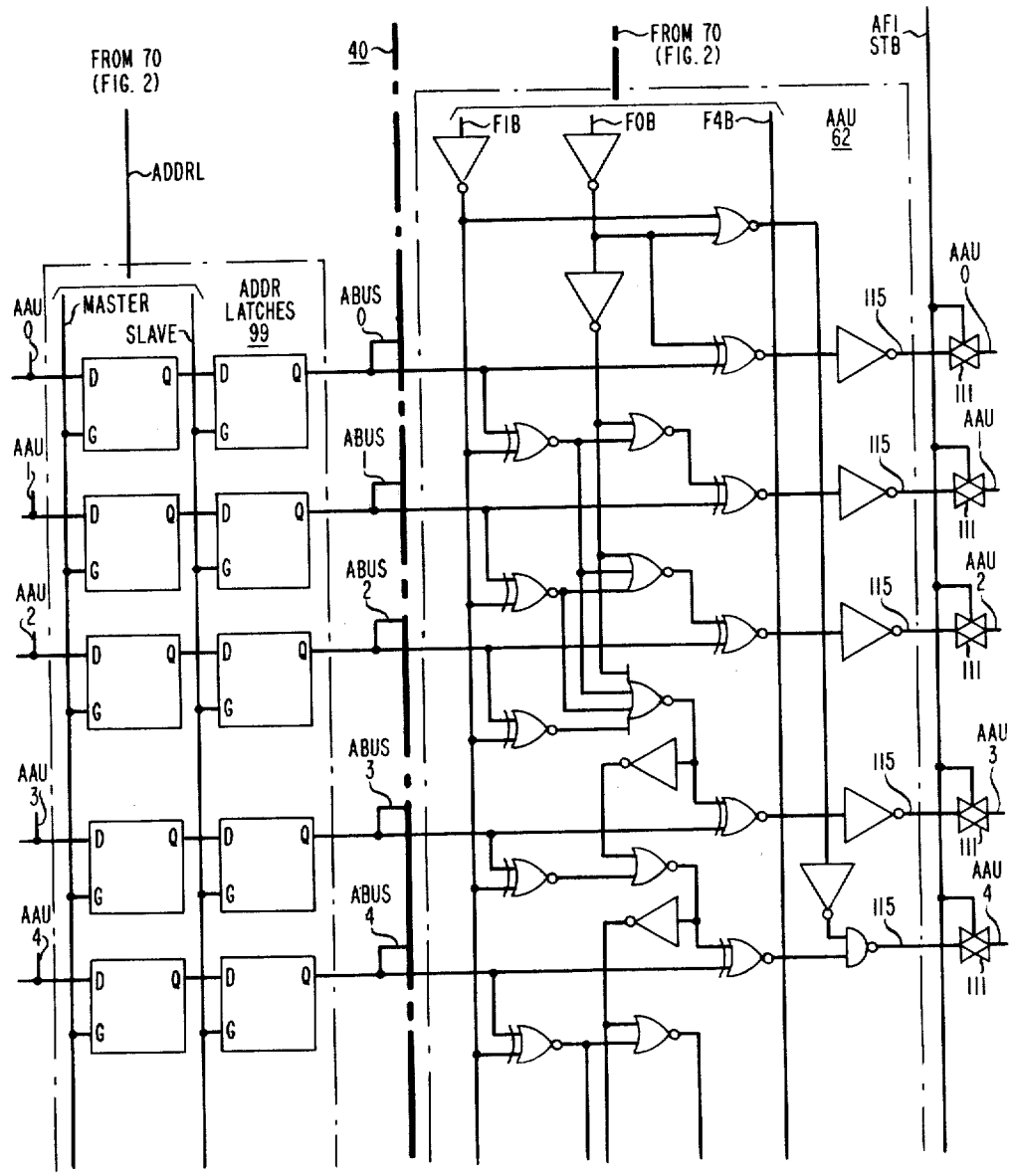
FIGS. 13 and 14, when positioned in accordance with FIG. 15, form a logic schematic of an address arithmetic unit with buses and gates.
Figure 14:
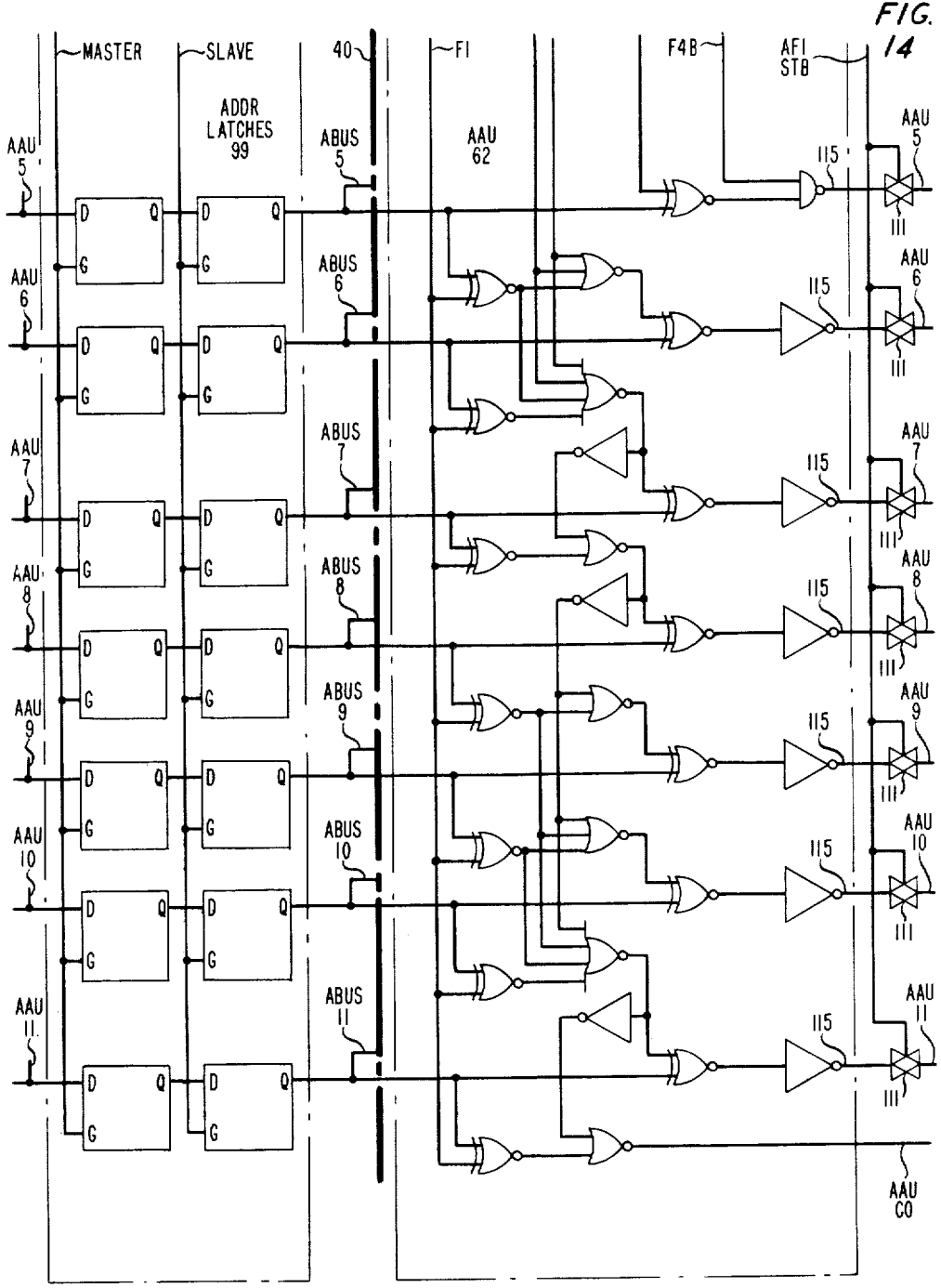

In FIGS. 3, 13 and 14, the address arithmetic unit 62 is a 12-bit parallel arithmetic unit arranged for incrementing or decrementing by one any information applied to its input from an address latch circuit 99. Unit 62 is a combinational logic circuit dedicated to address functions.

In addition to basic incrementing and decrementing functions, the address arithmetic unit 62 is arranged to perform three other operations. The five functions are controlled in response to three control signals F0B, F1B and F4B from the control PLA and random logic circuit 70. First of all in response to an NOP code, the unit 62 does nothing. Additionally, if generates either a trap address or an interrupt address, respectively, in response to trap and interrupt codes. These trap and interrupt addresses are generated by first resetting the address data to all zeros in the address latches 99, by gating the masters while the transmission gates 111 are disabled, and thereafter processing the all zeros through the address arithmetic unit while jamming a bit into a selected bit position. Such bit jamming is accomplished by applying signals to leads F0B, F1B and F4B. This generates the address x(020) for an interrupt routine and the address x(010) for trap.

As shown in FIGS. 3, 13 and 14, address latches 99 are a set of 12 parallel master/slave flip-flop circuits, arranged to receive and store temporarily in the masters address data presented on an address arithmetic bus 100. Data on the bus 100 arrives there from either (a) the data bus 24 by way of a multiplexer 102, (b) registers 60, 64, 66, 78, 80, 82, 92 and 93 or (c) the address arithmetic unit 62. An address stored in the masters of the address latches is transferred into the slaves where it is applied to the address bus 40. The transfer of addresses from masters to slaves occurs once every machine cycle.

Address bus 40 is a 12-bit parallel bus for applying any address stored in the slaves of the address latches 99 to inputs of the special address decoder 45 and the address arithmetic unit 62. The address is applied also to the address inputs of the read only memory 20, the random access memory 22 and a 12-input to a 1-out-or-16 decoder 106 associated with the input/output latches 36.

Address Arithmetic Bus Structure

As shown in FIG. 3, the address arithmetic bus 100 is a twelve-lead bus interconnecting the address arithmetic unit (AAU) 62, the address latches 99, the registers in internal random access memory (IRAM) 61, the registers in temporary random access memory (TRAM) 73 and the multiplexer 102.

Some addresses are formed in the microcomputer by concatenating three nibbles of data from the data bus 24. These nibbles originate by reading them out of the read only memory 20 or out of the random access memory 22. They appear serially by nibbles on the data bus 24 and are concatenated by writing them into their respective nibble positions in one of the registers in memory 61 or memory 73.

The address arithmetic bus 100 and the connected circuits are arraged to generate memory addresses used in processing data in the microcomputer. Sets of transmission gates 111, 112, 113 are interposed in the bus leads so that the bus is separable into segments. Depending upon control signals applied to the transmission gates 111, 112 and 113 and to the multiplexer 102, bus segments 115, 116, 117 and 118 are opened selectively from one another so that simultaneous transfers of data from separate sources can occur through different segments. Such simultaneous data transfers enable a saving of operating time while accomplishing some processing functions.

Special Address Decoder

The special address decoder 45 of FIG. 3 includes circuitry for providing address decoding for the registers 31, 33, 35, 60, 64, 66, 78, 80 and 82. Upon detection of the addresses for registers 31, 33 and 35, the special address decoder enables input/output and read/write logic signals which control the read/write operations of those registers. Once decoded in the special address decoder 45, the addressing of the registers 60, 64, 66, 78, 80 and 82 is controlled by other signals from the decoder 45. Signals on control lines 122 in FIG. 3 determine which four of twelve gates in the multiplexer 102 are activated at any time. They enable transfers of data serially by nibbles from the data bus 24 to three nibbles of the address arithmetic bus 100 and vice versa.

Decoder 45 circuitry of FIG. 3 also provides address decoding for the input/output latches 36, the bidirectional input/output bus transmission gate 37, the inport transmission gate 38 and the programmed logic array encoder 39 of FIG. 1.

In FIG. 3, the special address decoder 45 determines which of the input/output circuits is addressed by the initial special addresses. The particular input/output circuits are identified by a three bit code which is transmitted from the special address decoder 45 to an I/O address logic circuit 120 in FIG. 2. This I/O address logic circuit is a three input to 1-out-of-7 decoder with the outputs being used for accessing seven different input/output latch circuits. Concurrently with a read signal RD or a write signal WR applied from the controller, an active output signal is applied from the I/O address logic circuit 120 to the input/output latch being addressed.

When the registers 31, 33, 35, 60, 64, 66, 78, 80 and 82, the latches 36, and the transmission gates 37 and 38 are addressed as a destination in the direct addressing mode, the special address decoder 45 overrides the processor control register 33 and controls the appropriate number of nibbles to be transferred.

The special address decoder 45, the control programmed logic array 70, the address arithmetic unit 62, the address latches 99 and parts of the central control arrangement automatically generate a sequence of addresses in response to information derived from a single special address. The sequence of addresses are multiple destinations for monadic instructions and are both destinations and sources for dyadic instructions.

Additional details relating to the arrangement and operation of the special address decoder 45 are presented in the previously mentioned application V. K. Huang 3, entitled "Special Address Generation Arrangement" and filed concurrently herewith.

Figure 16:
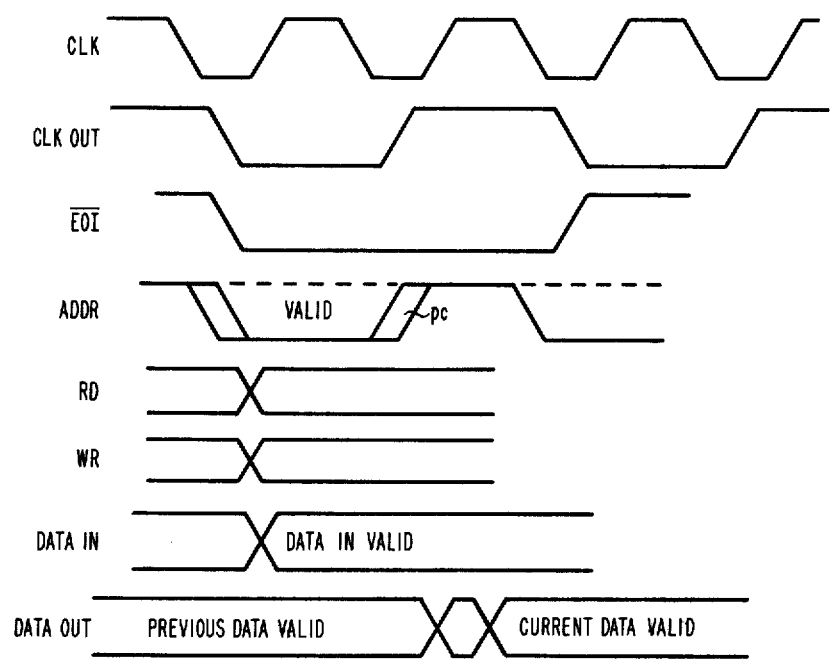
FIG. 16 is a timing diagram for the microcomputer of FIGS. 1–3.

Referring now to FIG. 16, the timing diagram shows the relationships among several signals occurring during operation of the microcomputer of FIGS. 1, 2 and 3.

The signal CLK is applied from an external source to the circuit of FIGS. 1, 2 and 3 for determining relative timing of operations performed by the microcomputer.

Signal CLK OUT is a timing signal produced by the controller for enabling various circuits within the microcomputer and various off chip peripheral circuits which may be connected to the microcomputer.

An end of instruction signal EOI is a control signal produced by the controller to indicate the termination of a sequence of events that are known as an instruction. A waveform designated ADDR represents when during the performance of an instruction the address on address bus 40 is valid. Associated read and write signals RD and WR also are shown at an appropriate time while the address is valid.

The signal RD is produced by the controller section of FIG. 2 for enabling a read operation from either the read only memory 20 or the random access memory 22, the input/output latches 36 or IRAM 61.

Signal WR produced by the controller section enables writing into either the random access memory 22 or the input/output latches 36.

Signal DATA IN represents data read into the microcomputer from a peripheral device. Such data should be valid at the time shown.

Signal DATA OUT represents data read out of the microcomputer to a peripheral device. Such data will be valid at the time shown for current data in the waveform DATA OUT.

Now that the circuitry and timing of the machine have been described, the advantageous operation thereof can be appreciated by the following description of an illustrative operation. For this operation, it is assumed without discussion that the read only memory 20 and the random access memory 22 are storing valid information that includes a legitimate program for the machine. The read only memory 20 stores a program start up sequence in a block of addressable memory commencing at a hexadecimal address x(000). Storage of information in registers will be described as required subsequently. It is further assumed that the machine has been reset putting the address x(000) into the program counter (PC) and into the address latches.

Exemplary Operation

Referring now to FIGS. 8 and 9, the state diagram shows states which occur during operation of the microcomputer. Although many states are shown herein, the diagram represents only a selected portion of a larger state diagram. The portion selected includes the part which illustrates operation of the microcomputer in a double opcode operation.

Each instruction includes a sequence of states starting at the top of the diagram and stepping one state at a time down through successive states of one path to the bottom of the diagram. With respect to the states, each has an associated identifying binary number. This binary number for the current state at any time is stored in the slaves of the state counter 96.

As shown in FIGS. 2, 10 and 11, signals SCOUT 1 through SCOUT 6 are gated out of the state counter. They are applied to the control programmed logic array and random logic 70 and the execution vector state decoder 98 and part of them are applied to the MUX control decoder 77.

In FIG. 11 the MUX control decoder 77 receives signals SCOUT 1 through SCOUT 4 from the state counter. Decoder 77 decodes these four signals into six outputs which are applied to the inputs of the transmission gate MUX 68. This decoding provides control signals for setting up information the control programmed logic array 70 is to receive for determining the next subsequent state. Thus the present state retained in the state counter controls selection by MUX 68 of pertinent data used by the control programmed logic array and random logic 70 for executing the next step in the execution of an instruction.

As shown in FIGS. 2 and 12, the transmission gate MUX 68 receives several inputs besides the control signals from the decoder 77. Four inputs DS 1 through DS 4 are received from the register 86. Seven inputs are applied from the instruction register decoder and latches 90. Signals are also applied from the instruction register 32, the program control register 33 and the direct memory access circuit 85.

The transmission gate MUX 68 produces outputs on four leads which apply those outputs to inputs of control programmed logic array 70. In the MUX 68 there is a selection of one-of-five possible output sets.

1—IR 1, RET+IRET, D, M
2—DS 1, DS 3, D, M
3—DS 2, DS 4, D, M
4—don't care, M/D+ESC B, I/O, I/O
5—don't care, don't care, ESC, B/J COND.

The selection of the pertinent one of these sets is determined by the MUX control decoder 77.

Referring once again to FIGS. 8 and 9, the uppermost state 0-3 is the initial, or starting state for all instructions. In FIG. 9 the lowest state 0-1 is the final, or last state from which the sequence returns to the initial state.

As previously mentioned, a single four-bit opcode stored in the instruction register provides sixteen different instructions. By sacrificing one of the sixteen different instructions in the first opcode, it is possible to pick up another sixteen instructions. Therefore each first opcode given up for double opcode operation provides a net of fifteen additional instructions.

For purposes of example, binary coded hexadecimal numerals D and E have been selected to initiate double opcode operations. The instruction register decoder and latches 90 respond to those initial opcodes.

Referring now to FIG. 6, there is shown a schematic of the instruction register decoder and latches 90. In the circuit 90, there are two sequential logic arrangements. Inclusion of memory devices for retaining the first opcode information, provides an efficient way to reduce chip area occupied by the control programmed logic array 70. The circuit 90 including NAND gates 601 and 603 and a D-type flip-flop 610 responds to binary code 1101 representing hexadecimal numeral D. The circuit including NAND gates 621 and 623 and a D-type flip-flop 630 responds to the binary code 1110 representing the hexadecimal numeral E.

Inputs for both circuits are applied directly from the instruction register. A clock signal CLK produced by the control programmed logic array 70 enables the flip-flops 610 and 630 to change state after the opcode is loaded and during the second state of the fetch sequence of each instruction. When the D or E opcode is stored in the instruction register at that time, the appropriate one of the flip-flops 610 or 630 latches up and retains the new state for the duration of the instruction. This latch up of the D and E opcodes is a compacted form of the information contained in the first opcode stored in the instruction register. Output signals from the circuit 90 are used by the controller for determining whether or not the first opcode is a special instruction and if it is to fetch a second opcode word in a subsequent state of the fetch operation. Output signals ESC and M/D, together with their respective complements ESCB and M/DB are produced by the flip-flops 630 and 610 of the instruction register decoder and latches of circuit 90. The latched state of flip-flops 610 and 630 remains unchanged throughout the instruction until it is reset during the last state of that instruction.

As shown in FIGS. 8 and 9, state 0-3 is to be followed by state 0-C. The first nibble of the instruction is fetched from memory and is latched into the instruction register →IR. Also the information in the slaves of the address latches is incremented by one in the address arithmetic unit 62 and is stored in the program counter and in the masters of the address latches. These latter functions are represented by the symbol s+1→PC, M. The state counter steps to the next state 0-C.

In state 0-C, the hardware latches in circuit 90 are loaded. A strobing control signal LD 3 is applied to the flip-flops 610 and 630 of the circuit 90 so that the information stored in the instruction register and applied to the circuit 90 determines the states of the flip-flops. The resulting state of each of the flip-flops 610 and 630 is retained for the remainder of the instruction. If either flip-flop 610 or 630 is set, two signals ESC and M/D and their complements indicate to the programmed logic array that the microcomputer is processing an instruction that began with an opcode word including a preamble hexadecimal D or E. They both are special instructions which require an extra fetch. The address in the address latches 99 is not incremented but is transferred from the slaves to the masters of the address latches. The controller steps to state 0-4.

In state 0-4 the next nibble of the instruction is fetched from read only memory 20 into the register D/S as indicated by the expression →DdSs. Again the address in the slaves of the address latches 99 is incremented in the address arithmetic unit 62 and is stored in the program counter and in the masters of the address latches. The state counter steps to the next state which may be either one of two possible states 0-6 or 0-5.

The sequence is forced to state 0-6 if the first opcode word was hexadecimal 0 through C for which neither the flip-flop 610 nor the flip-flop 630 in the circuit 90 is set. In state 0-6 the only operation that occurs is a transfer of the address from the slaves to the masters of the address latches.

The sequence is forced from state 0-4 to state 0-5 if the first opcode word was hexadecimal D or E for which either the flip-flop 610 or the flip-flop 630 in circuit 90 is set. In state 0-5 a second opcode word is fetched from the read only memory and is latched into the instruction register 32 replacing the first opcode word. This second opcode word now stored in the instruction register determines in part what subsequent sequence of operations is performed on data to be read from memory. This operation is represented by the symbol →IR. Additionally the address from the slaves of the address latches is incremented by the address arithmetic unit 62 and is stored in the program counter and the masters of the address latches. The machine steps to the next state 0-D.

In state 0-D, a wait state, the address in the address latches is transferred to the masters thereof. The machine then steps to state 0-6 which was described hereinbefore. State 0-6 is the state in which the execution vector is jammed into the state counter.

The previously described sequence of states 0-3 through 0-6 are referred to as a fetch sequence of an instruction. During fetch the microcomputer fetches either a single opcode word together with a destination and source code word D/S or a pair of opcode words together with the destination and source code word D/S. When the single opcode word is fetched without setting flip-flops 610 and 630, that opcode word together with the reset states of the flip-flops 610 and 630, determines the subsequent sequence of operations during the remainder of the instruction. When the double opcode words are fetched, the second opcode word overrides and replaces the first opcode word stored in the instruction register. This second opcode word and the set state of one or the other of the flip-flops 610 and 630 determine the subsequent sequence of operations during the remainder of the instruction. This control arrangement is used so that the controller maintains sanity and knows which instruction is being processed.

Once the fetch sequence is finished, an execution sequence is commenced. The state in which the execution sequence starts depends upon whether or not an execution vector is jammed into the state counter 96.

Assuming for the sake of example that the instruction being executed is "Increment the Data Pointed to by the Contents of Pointer Register P0", the machine performs a double opcode operation. A 12-bit data word representing an address of a memory location previously has been stored in the register P0. During the state 0-3, the opcode fetched into the instruction register is 1101, or hexadecimal D. Circuit 90 of FIG. 6 produces a low signal on the lead ESC and a high signal on the lead M/D. These signals ESC and M/D are applied to the input of execution vector logic of FIG. 6 through the remainder of the instruction. The data written into the register D/S during state 0-4 is two bits of the address identifying the registor P0 in the internal random access memory 61. During state 0-5 the second opcode fetched into the instruction register is 0000 or hexadecimal 0. The second opcode plus the signals ESC and M/D control the subsequent processing of data during the instruction.

During the state 0-6. the execution vector output signals are selected by the multiplexer 97 and are jammed into the state counter 96 instead of output signals from the control PLA 70. The resulting state jammed into the state counter is the state 1-F.

In state 1-F, the contents of the register P0 in the internal random access (IRAM) 61 is transferred to the temporary register T0 in the temporary random access memory (TRAM) 73, as represented by the symbol IRAM →TRAM. The data transferred is a 12-bit address pointer. Thereafter the machine steps to state 1-A.

In state 1-A, the contents of the temporary register T0 is transferred to the masters of the address latches where the address formerly in the register P0 is readied for application to the address Bus. At the end of state 1-A, the address is shifted from the masters to the slaves of the address latches. The machine then steps to the next state 2-3.

In state 2-3, the contents of temporary register T1 of the temporary random access memory 73 is transferred to the masters of the address latches, as represented by the symbol T1 →M. The machine steps to the next state 2-4 with the address in the masters being shifted to the slaves of the address latches.

During state 2-4, the information stored in the address originally stored in the pointer register P0 and now applied to the address bus is fetched from memory and is stored in the temporary register TA 26 associated with the arithmetic logic unit 30. This function is represented in state 2-4 by the symbol →TA. Also the address in the slaves is transferred to the masters of the address latches as shown by the symbol S →M. The machine then steps to state 2-0.

In the state 2-0, the arithmetic logic unit 30 is turned on for incrementing the data now stored in the temporary register TA 26, as indicated by the symbol ALU ON. Additionally, the address arithmetic unit (AAU) 62 increments the address stored in the slaves of the address latches. The resulting incremented address is stored in the temporary register T1 as shown by the symbol S+1→T1. Thereafter the machine steps to the state 2-1.

During state 2-1, the arithmetic logic unit 30 is held on while the incrementing function is accomplished. Logic in the controller section decodes the second opcode word still stored in the instruction register together with the signals ESC and M/D from the instruction register decoder and latches circuit 90 of FIG. 6. The resultant decoded instruction informs the arithmetic logic unit 30 that the increment function is to be accomplished during this instruction. The resultant incremented data is written to the memory location being addressed by the address latches. There is a write signal from the control programmed logic array and random logic 70 of FIG. 2 causing the information from the output of the arithmetic logic unit and residing on the data bus to be written to a location identified by the address on the address bus. Such address is the same address from which the data was fetched and which is pointed to by the pointer register P0.

Thus data stored in the location pointed to by the contents of register P0 has been fetched and incremented. The resulting incremented data has been stored back in the location pointed to by the contents of the pointer register P0.

Figure 17:
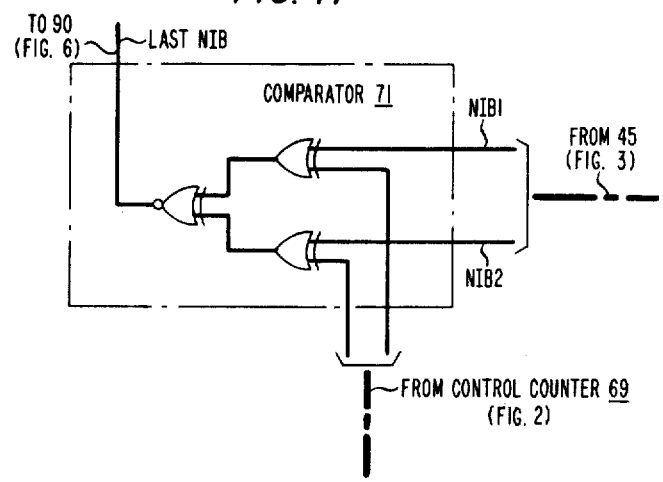
FIG. 17 is a logic schematic of a comparator.

Assuming that the contents of the program control register 33 is set for a single operand instruction, the special address decoder 45 produces appropriate code to a comparator 71 of FIGS. 2 and 17. Counter 69 produces similar code which is also applied to the comparator 71. With this comparator 71 being satisfied and producing a signal LAST NIB, the machine steps directly to the state 0-1 which is the final, or end, state of the instruction. During the state the contents of the program counter (PC) 60 of the internal random access memory 61 is transferred into the masters of the address latches, as shown by the symbol PC →M. When this address is shifted into the slaves of the address latches at the end of state 0-1, the machine is ready for commencing the next instruction in the program.

This completes the processing of the instruction "Increment the Data Pointed to by the Contents of the Pointer Register P0". The exemplary double opcode operation thus terminates and the machine steps to state 0-3 for commencing the next instruction.

Other double opcode operations which can be accomplished by the microcomputer include:

Increment Specified Data
Rotate Left Through Carry
Decrement Specified Data
Rotate Right Through Carry
Complement Specified Data
Clear Data in a Specified Location
Set Data in a Specified Location
Add Specified Operands
Add with Carry
Subtract Specified Operands
Subtract With Borrow
AND
OR
Exclusive OR
Move Bit
Jump If Less Than
Jump If Equal
Jump If Not Equal
Test Jump If Zero
Jump If Not Zero
Jump If Zero
Jump If Bit Clear
Jump If Bit Set
Decrement Jump If Not Zero
CALL
JUMP
HALT
RETURN
Return from Interrupt

Chip Fabrication

The microcomputer arrangement described hereinbefore is designed for fabrication as a single chip, totally self-contained microcomputer for controller system applications. It is fabricated in known CMOS technology.

The foregoing description describes an embodiment of the invention. In view of that description, additional embodiments will be obvious to those skilled in the art. The scope of the invention is considered to include the described embodiment together with embodiments which are obvious to those skilled in the art.

We claim:
1. A microcomputer including
a memory for storing single and double opcode instructions, each instruction having plural words, each word having n bits;
an instruction register having n stages;
a data bus coupling the memory to the instruction register;
an arithmetic logic unit interconnected with the data bus and arranged for executing at least a part of defined processing sequences on data supplied over the data bus, the processing sequences being defined by the single and double opcode instructions;
controller means for producing a plurality of control signals including a clock signal, the controller means causing the microcomputer to process the single and double opcode instructions by first fetching the single opcode word of the single opcode instruction from the memory through the data bus to fill the instruction register;
latching means having plural states;
logic means, included within the controller means and interconnected with the instruction register and with the latching means, being responsive to the single opcode word of the single opcode instruction stored in the instruction register and to the clock signal produced by the controller means for producing a signal which latches the latching means into a first state indicating that there is sufficient information in the instruction register for prescribing the processing sequence defined by the single opcode instruction;
the controller means including means responsive to the first state of the latching means and to the opcode word of the single opcode instruction currently stored in the instruction register for causing the microcomputer to execute the specific processing sequence defined by the single opcode instruction;
the controller means including means responsive to the microcomputer completing the execution of the processing sequence defined by the single opcode instruction for causing the microcomputer to continue processing the single and double opcode instructions by fetching a first opcode word of the double opcode instruction from the memory through the data bus to fill the instruction register;
the logic means being responsive to the first opcode word of the double opcode instruction now stored in the instruction register and to the clock signal produced by the controller means for producing a signal which latches the latching means into a second state indicating that there is insufficient information stored in the instruction register for prescribing the processing sequence defined by the double opcode instruction;

the controller means including means responsive to the second state of the latching means for causing the microcomputer to fetch a second opcode word of the double opcode instruction from the memory through the data bus to replace the first opcode word in the instruction register before the microcomputer executes the processing sequence defined by the double opcode instruction; and the controller means including means responsive to the second state of the latching means and to the second opcode word of the double opcode instruction currently stored in the instruction register for causing the microcomputer to execute the specific processing sequence defined by the double opcode instruction.

2. A microcomputer in accordance with claim 1 wherein the state of the latching means incidating in compacted form information contained in the first opcode word of the double opcode instruction.

3. A microcomputer in accordance with claim 1 wherein the first opcode word of the single opcode instruction has a predetermined binary bit pattern for causing the microcomputer to execute a first specific processing sequence and the second opcode word of the double opcode instruction has the same predetermined binary bit pattern for causing the microcomputer to execute a second specific processing sequence that is different from the first specific processing sequence.

4. A microcomputer in accordance with claim 1 wherein the controller means includes a state counter coupled to the latching means;

the state of the latching means causing the state of the state counter to change; and the states of the state counter and of the latching means together with the second opcode word of the double opcode instruction stored in the instruction register causing the microcomputer to execute the specific processing sequence defined by the double opcode instruction during the execution of the double opcode instruction.

* * * * *